Jan. 4, 1966  P. FESSEL  3,227,416
CUTTING TOOL
Original Filed Feb. 1, 1960  4 Sheets-Sheet 1

INVENTOR
Paul Fessel

BY
ATTORNEY

Jan. 4, 1966  P. FESSEL  3,227,416
CUTTING TOOL
Original Filed Feb. 1, 1960  4 Sheets-Sheet 2
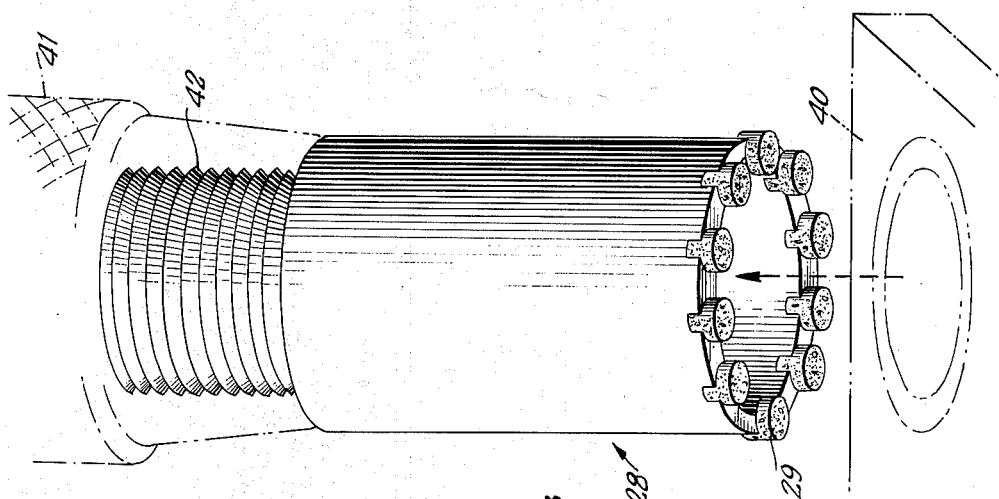
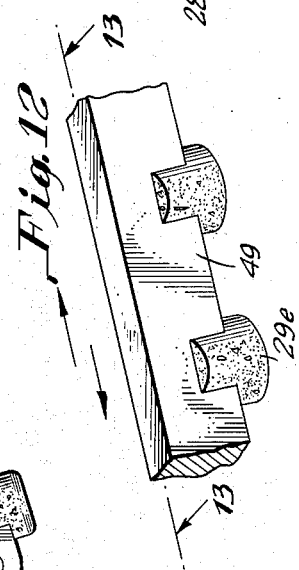
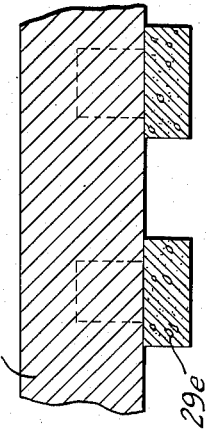
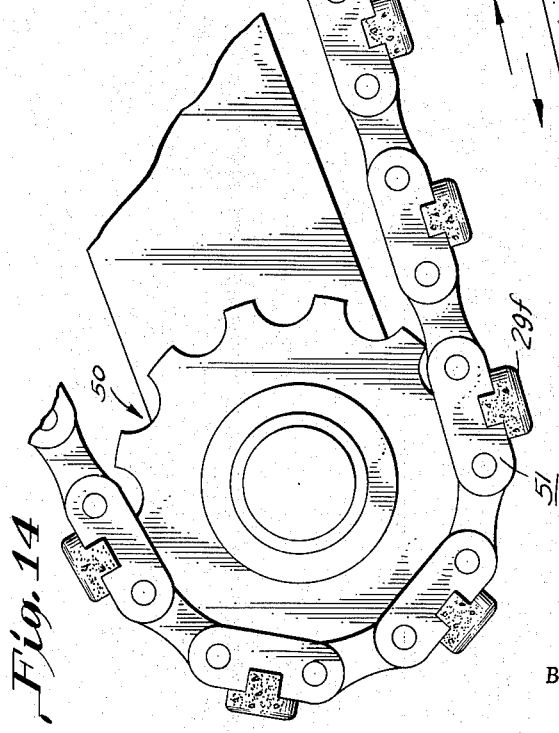
INVENTOR
Paul Fessel
BY
ATTORNEY

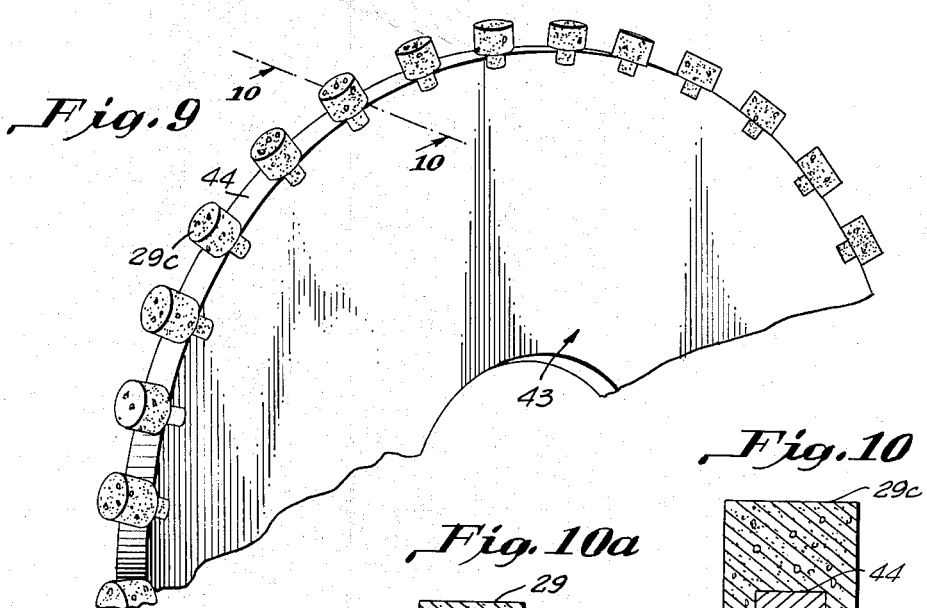
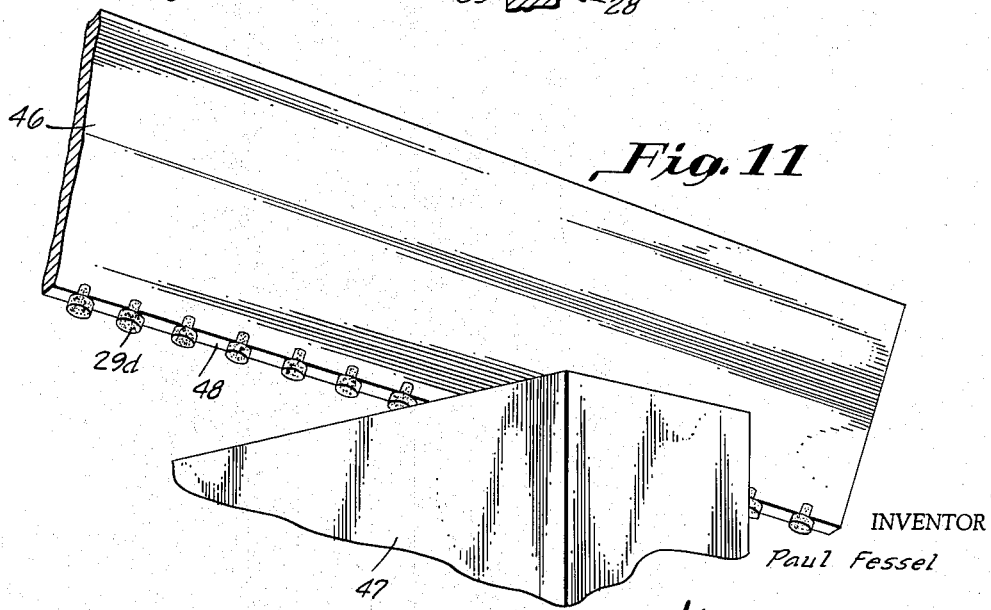

Jan. 4, 1966  P. FESSEL  3,227,416
CUTTING TOOL
Original Filed Feb. 1, 1960  4 Sheets-Sheet 4

INVENTOR
Paul Fessel

BY
ATTORNEY

United States Patent Office 3,227,416
Patented Jan. 4, 1966

3,227,416
CUTTING TOOL
Paul Fessel, 1111 Ocean Ave., Brooklyn 30, N.Y.
Original application Feb. 1, 1960, Ser. No. 5,675.
Divided and this application Feb. 25, 1963, Ser. No. 260,912
2 Claims. (Cl. 249—61)

This application is a division of copending application, Serial No. 5,675, filed February 1, 1960, and now abandoned.

This invention relates generally to die for cutting devices, but more particularly to a die structure to form a cutter associated with the edge or periphery of a tool for cutting stone, concrete, both cured and fresh, and other ceramic, vitreous and refractory materials.

The main object of the invention is to provide a die structure for a cutting body formed of a uniform matrix or characterized by a composition of abrasive particles bonded in, by and throughout a suitable matrix, said cutting body being characteristically joined to the tool edge or periphery for positive retention.

A further object of the invention resides in the provision of a die structure for forming an abrading or cutting body associated with rotable drill or tubular, reciprocally movable, rotable disc and other types of saws and cutting apparatus wherein the cutting part is novelly molded on the tool edge or periphery for positive retention.

Another object of the invention resides in the novel die structure for forming cutting tools of the above characteristics having the efficiency to include heavy duty work on available or 110 volt power lines. Such efficiency and capacity is attributable to the novel die structure used to form the cutting edge, the latter comprising a plurality of spaced and discrete cutting heads or bodies molded, sintered and fused by use of the novel die structure in any preselective dimensioning, shaping and spacing to the edges and adjacent sides of the tool body in saddle form. Such dimensioning and shaping permits wide variations in the resultant kerf, and in utilizing widths or gauges of the edge or periphery of the tool body of smallest dimensions controlled only by the strength of the tool body or shank.

Another object of the invention resides in the novel die structure capable by a single compression under elevated temperature of simultaneously molding, sintering and fusing cutting heads or bodies on the tool edge or periphery in saddle formation, including utilization of novel apparatus comprised of single use unitary dies of low cost and requiring destruction for removal, the tool edge and adjacent side area also serving as an effective die member during the molding, sintering and fusing operation.

General drilling problems have involved limitation of electrical driving power and nonconformity of concrete especially in diamond drilling for construction. The industry has attempted to solve such problems by providing a core bit (cylindrical tube) with as thin a wall as possible; but trouble has been encountered in retention of the matrix or cutting heads or bodies to the leading edge of such a bit or tube. As a consequence, surface set bits have been resorted to in connection with the core bit as in other types of cutting tools.

In surface-set bits, only one layer of cutting stones or diamonds is utilized, and to compensate for efficiency and economy of operation, diamonds of the highest quality must be selected and hand-set to make certain that a particular crystallic face meets a given vector at the right angle. Use of surface-set bits has been successful in prospecting or mining where solid and consistent stone formations are present. However, such cutting tools have proven highly unreliable in construction work because concrete is not of uniform hardness and the aggregate may range from Mississippi gravel to Long Island bluestone.

For these reasons, and especially in construction, the impregnated as against surface-set bits are more desirable but these have been heretofore limited because of thinness of tool body edges and peripheries making same ineffectual.

The invention herein, because of the particular and novel means for impregnating spaced cutting heads on the edges or peripheries of tool bodies, has overcome all objections to prior impregnated bits. In addition, tools formed by the die structure of the invention herein are more efficient, have longer life, require less driving power, are cheaper to manufacture, and are more varied and controlled for desired size of kerf and depth and disposition of the impregnation.

Another object of the invention is the provision of an improved die structure for forming a saw or cutting apparatus having spaced matrix or abrading body formations as aforesaid as a material element of the cutting edge, and further providing lateral projections so constructed and arranged that less than the full side areas of the abrading body formations contact the adjacent side walls of the partially severed material operated upon for minimization of matrix friction.

A further object of the invention is to provide a novel die structure to form spaced abrading bodies secured to and superposed on cutting and sawing tools consisting of an abrading matrix or a matrix and abrasive particles bonded by and substantially throughout said matrix and wherein combined cutting area of said bodies for width of cut provides a minimum of cutting surface area resulting in economy of expensive abrasive particle or matrix material that may be used.

Each of the spaced abrading body formations is adapted to be applied by the novel die structure apparatus herein to a shank of any type which is adapted to be driven either linearly, reciprocally, for rotation as the periphery on a disc or for rotary movement as a drill.

These objects and other incidental ends and advantages of the invention will hereinafter appear in the progress of the disclosure and as pointed out in the appended claims.

Accompanying this specification are drawings showing preferred forms of the invention wherein:

FIGURE 3 is a diametric sectional view of FIGURE 2 showing the die openings and the die groove in engagement with the tube edge and walls thereof;

Figure 3:
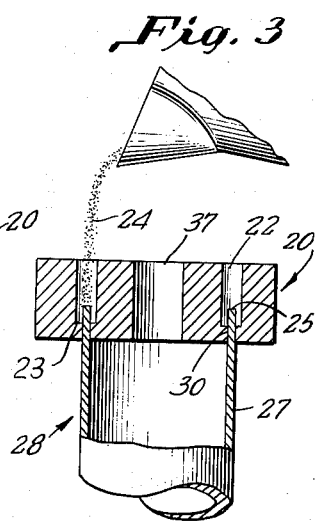
Figure 4:
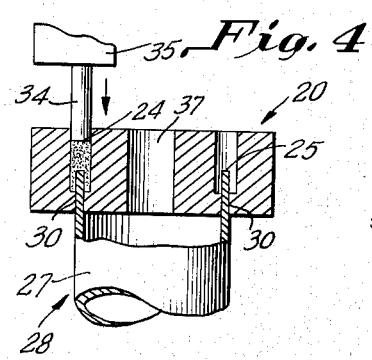
Figure 5:
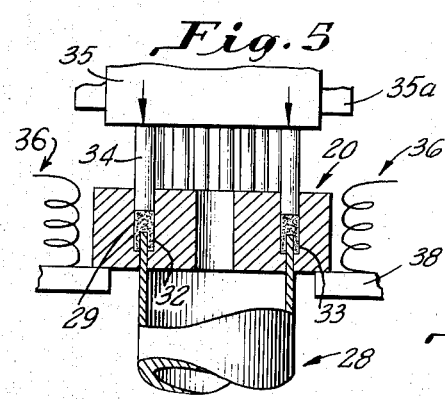
Figure 6:
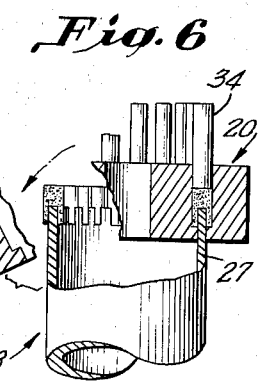
Figure 7:
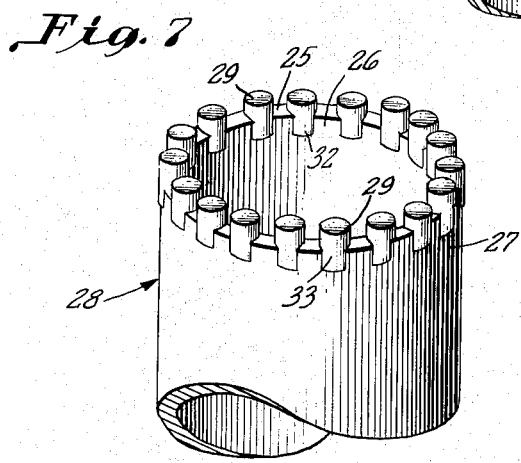
Figure 15:
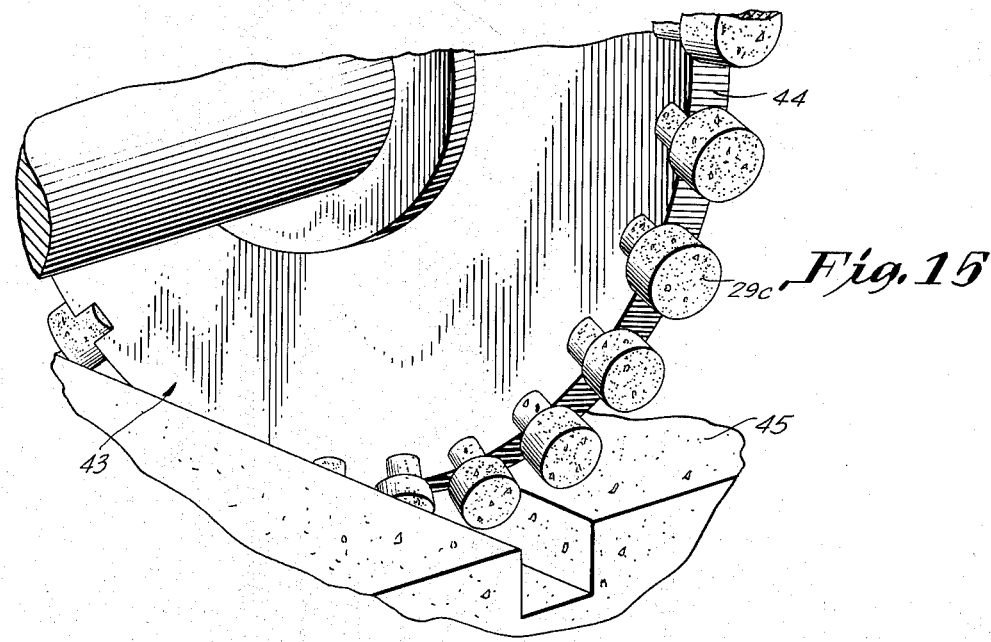
Figure 16:
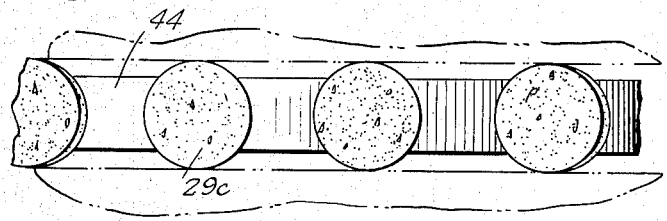
Figure 17:
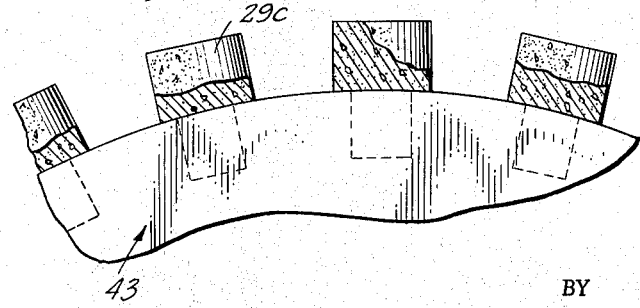

FIGURE 4 is a diametric sectional view similar to FIGURE 3 showing one of several plungers for each of the die openings after die opening loading;

FIGURE 5 is a diametric sectional view partly in elevation showing a pressure plate applied to the tops of the plungers for molding, sintering and fusing of the loading matrix material within the die under controlled elevated temperature to the edge and adjacent side walls of the tube;

FIGURE 6 is a diametric sectional view partly in elevation showing breaking away and destruction of the die after the cutting heads are formed;

FIGURE 7 is a view in perspective of the resultant tool having a plurality of spaced cutting heads impregnated on a tube edge and on opposite adjacent side walls in saddle formation;

FIGURE 8 is a view in perspective showing the tool of FIGURE 7 mounted for drilling operation;

FIGURE 9 is a view in perspective showing the cutting heads of FIGURES 1–7 applied by means of the die structure to a disc type of cutting tool;

FIGURE 10 is a sectional view of FIGURE 9 across the plane 10—10 thereof;

FIGURE 10a is a sectional view of a form of cutting head applied by the novel die structure to a tool edge having a retention indentation on the side wall thereof;

FIGURE 10b is a sectional view of a form of cutting head applied by the novel die structure to a tool edge having a cutting matrix ground for facet formation;

FIGURE 11 is a view in perspective showing cutting head as applied by the novel die structure to form a band saw type of tool;

FIGURE 12 is a view in perspective showing cutting heads applied by the novel die structure to form a reciprocating type of tool;

FIGURE 13 is a sectional view across plane 13—13 of FIGURE 12;

FIGURE 14 is a view in perspective showing cutting heads applied by the novel die structure to form a chain saw type of tool;

FIGURE 15 is a fragmentary view in perspective showing the cutting heads impregnated by the novel die structure on the periphery of a rotating disc, the device being in process of effecting a cut groove in stone material;

FIGURE 16 is a top plan view of the cutting surface of the cutting heads formed by the novel die structure and shown on the periphery of the disc in FIGRE 15; and FIGURE 17 is a view in elevation of the structure shown in FIGURE 16.

In accordance with the invention and the preferred forms shown, FIGURES 1–7 show the novel die structure apparatus and one form of tool formed by the die structure invention.

Thus numeral 20 indicates generally a main die formed of graphite or ceramic material and as shown consists of a disc or solid block 21 shown in the form of a cylindrical section and includes a plurality of individual, spaced and vertical bores each indicated by numeral 22 and all drilled preferably to a common selective depth from the upper face of the block, the bottom of each of the bores being indicated by numeral 23. As shown, bores 22 are concentrically arranged and each is adapted to receive a load of impregnating material 24 for molding, sintering, fusion and integration with the edge 25 and adjacent wall portions of side walls 26 and 27 of a cutting tool shank such as tubing 28.

For in situ molding, sintering, fusion and saddle-like connection of the impregnating material 24 toward the formation of cutting heads or slugs 29 on shank 27, die 20 on the underside has a concentric slot or groove 30 to serve as a mortise for the end portion of tubing 27 and being of a predetermined depth, the circular axis of the slot 30 being in registry with the circular axis formed of the centers of bores 22 as is obvious from FIGURES 2–6.

Important considerations of the invention reside in the integral relationship of bores 22 and slot 30 formed in a one piece or unitary die 20; in the respective dimensioning of said bores and slot; and in the single use of the die for each cycle or use of operation, the die requiring shattering and destruction for removal.

Thus, the diameter of each of the bores 22 is predeterminable in excess of the width of slot 30 for kerf control by the formed slug 29; and each of the bores is predeterminably dimensioned in length and in extension below the ceiling or top wall 31 (see FIGS. 1 and 2) of the slot for control of slug height above shank edge 25 and for control of depth of the slug saddle-like sides 32 and 33 below the shank edge.

Figure 1:
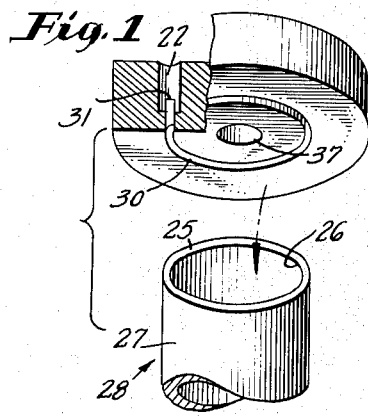
FIGURE 1 is an exploded view in perspective showing a destructible die in registering position with a tube for application to the edge thereof of a plurality of spaced cutting heads.
Figure 2:
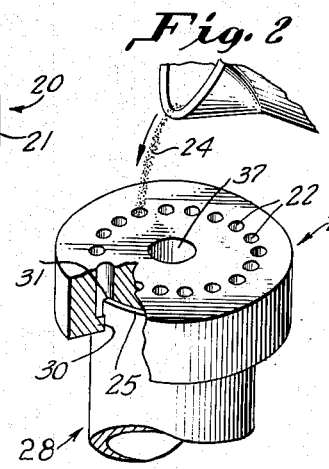
FIGURE 2 is another view in perspective partly in section showing the die applied to the tube edge in a concentric groove and showing spaced cylindrical die openings in process of being loaded with impregnating material.

It is to be observed that alignment between die 20 and shank 28 is effected by the abutment between shank edge 25 and slot ceiling 31 as best seen in FIGURES 1 and 2; said abutment obtains in die 20 intermediate each adjacent bore pairs; that tool shank edge 25 and adjacent side wall portions serve as a connected, complementary and contacting die with die 20 to form molding areas therewith as with each of the bores 22 which the shank edge and adjacent side wall portions penetrate to the aforesaid limited extent.

It is to be observed that following connection or fitting of shank 28 with die slot 30 and after loading the bores 22 with a predetermined quantity of impregnating powder 24, a die apparatus for a molding procedure is set up whereby application of controlled pressure under controlled temperature to the fitted die 20 and shank 28 effectuates a simultaneous molding, sintering and fusing of abrasive-containing matrix powder or tungsten carbide or other powder of cutting potential. For such purpose a removable or shatterable graphite or ceramic plunger 34 having a projecting upper end 35 is used as a compression element fitted for reciprocation in each of the bores 22; a controlled pressure platen 35 to simultaneously engage each of the upper plunger ends is utilized and a conventional heating apparatus generally indicated by numeral 36 surrounds the die 20. Depending upon known requirements, pressures applied to the impregnating powder in each of the molds formed between each bore 22 and shank edge and side wall parts by plungers 34 vary depending upon nature, amount and disposition of the impregnating powder, while temperatures may also vary including a range of 1800–2400 degrees F.

Following such molding, sintering and fusion, the graphite or ceramic die with the plungers 34 is broken away or shattered as at 20a and there results the tool shown in FIGURE 7 with the cylindrical slugs 29 projecting above and secured to the shank edge 25, each of said slugs having cylindrical side sections 32 and 33 serving as the aforementioned saddle side walls. Although spaced slugs 29 on shank 28 are shown in specific number, the number thereof may be varied by variation in the number of bores 22, it being feasible to have slugs at 90 degree intervals. Moreover, the diameter of bores 22 may also be varied as well as their dispositions to give slugs of different diameters and disposition depending on requirements.

As to problems of support, registration of parts and distribution of pressure loads for the aforementioned single cycle compression operation, the invention comprehends the use of a fixed support such as diagrammatically illustrated at 38 for die 20 to receive the impact of compression pressure imposed by a descending platen 35 engaging the tops of plungers 34 which below are in bores 22, the platen being suitably mounted in a frame such as is diagrammatically illustrated at 35a. Thus no pressure is transferred to shank 28 during the molding, sintering and fusion operation.

It is to be noted that die 20 as shown is provided with a central opening 37. Its function is to expedite registering formations of slot 30 and bores 22 from the original graphite or ceramic block. Thus, the die block may be mounted on an arbor through opening 37 for first drilling bores 22 on one side, and then reversing the block on the arbor for milling slot 30.

The formation of slugs 29 on shank 28 provides a discontinuous matrix; shank wall thinness is limited only by strength thereof since holding of the matrix to the shank edge 25 is supplemented by a holding to the side wall portions as by wing parts 32 and 33; the kerf can be made as narrow as desired (limited only by the strength of the tubing or shank 28) by reason of the self centering of parts between the bore diameters of die 20 and the shank edge 25; the abrasive in the impregnating mix may be of any size and the slug size is not affected thereby.

The cost of die 20 and of plungers 34 are sufficiently low to justify shattering for removal after each molding, sintering and fusion operation is completed. The graphite or ceramic used and the processing of same involves a negligible cost compared to the cost of production of the cutting tool.

It is understood that the edge 25 of shank 28 may have a rounded, beveled or other geometric shape and as stated that the shapes and dimensions of the molding areas afforded by shank 28 and die 20 may vary to suit requirements. The tool embodying slugs 29 formed from the die apparatus is capable of cutting not only vitreous, concrete and other materials but penetrates reinforced concrete including steel or other hard metallic material.

Moreover, the tool with slugs 29 may have a longer life than the depth of projecting slugs 29 above shank edge 25; for when edge 25 is circumferentially exposed, slug portions 32 and 33 may still do the cutting all the way down to the depth thereof, the circumferential metallic surface 25 wearing down and the cutting being done by the top exposed portions of the wing elements 32 and 33.

Additionally, the slugs 29 may have the diameter or overall cutting dimension varied by the novel die structure used in production, so that the bigger the kerf the less chance of eroding the shank 28 of the tool when the latter is off center during drilling operations.

In FIGURE 10a, shaft 28 is modified to have spaced indentations 39 on the outer or inner sides adjacent edge 25 for increasing the retention between slugs 29 and end portion of the shaft 28. However, such indentations are not necessary for retention during tool operation because of the saddle connection to resist shear and other stresses.

In FIGURE 10b, a slug 29a molded by the die structure is shown formed from a cutting type of uniform matrix without containing an abrasive such as tungsten carbide. However, such a slug has its faces ground for conventional cutting facets such as 29b.

FIGURE 8 shows the operation of the cylindrical tool with its slugs 29 molded by the die structure herein operative on a slab of stone or concrete 40 shown in phantom. The shank 28 at its end is conventionally coupled (as by threading 42 if desired) to a rotary power tool diagrammatically indicated by numeral 41.

FIGURES 9, 10 and 15 show slugs 29c molded by the die structure herein similar to slugs 29 applied to a type of cutting tool having a disc body 43 with a circular edge 44 to which the saddled-formed slugs are applied in selectively spaced relationship. Of course, in the method of molding, sintering and fusing the slugs 29c on the disc edge 44, the die 20 is suitably modified (not shown) as by the use of a plurality of ring segments having a groove along the center of the bottom to engage a segment of the disc 43, there also being corresponding spaced bores in the same relationship with the groove as applies to the die 20. Procedures simliar to that obtaining for die 20 are used in production.

FIGURE 11 shows slugs formed by the die structure herein such as 29d similar to slugs 29 applied to a band saw type of tool having a shank 46, the tool being applied to a slab 47. Here again, in the method of molding, sintering and fusing the slugs 29d on the edge 48 and side walls portions of shank 46, die 20 is suitably modified (not shown) as by use of a plurality of longitudinal rods having a groove along the center of the bottom wall to engage segments of the shank edge 48 and adjacent side walls, there also being corresponding spaced bore in the same relationship with the groove as applies to the die 20. Procedures similar to that obtaining for die 20 are used in production.

In FIGURES 12 and 13 is shown a reciprocating type of tool having a shank 49 and slugs 20e formed by the die structure herein and of similar nature, formation and process of application as applies to band saw type of tool shown in FIGURE 11.

In FIGURE 14 is shown a chain-saw type of tool generally indicated by numeral 50 wherein each link 51 is provided with one or more slugs 29f formed by the die structure herein and of similar nature, formation and process of application as applies to the type of tools shown in FIGURES 11 and 12-13.

Thus, the invention comprises a novel die apparatus for cutting tools to form spaced slugs or cutting bodies on the tool edge or periphery wherein the slugs are molded, sintered and fused on such edge or periphery and on the adjacent side wall portions for retention and for opposing shear, breakage and other damaging forces; each of the slugs being in proper registry or on center with respect to the tool edge of periphery.

The novel apparatus includes graphite or ceramic unitary dies shatterable for removal and having suitable cavities therein for cooperating with the tool edge or periphery and adjacent side wall portions thereof, said tool edge and side wall portions cooperating as a complementary die with cavities and also serving to receive and be integrated with the molded cutting slugs to form the cutting tool under consideration.

The groove and cavity or cavities of the die structure are arranged to afford planes of weakness to enable the shatterable die and plunger parts to be removed or shattered away from the walls of the tool and the molded impregnating material thereon following die and plunger operation.

I wish it understood that minor changes and variations in the shapes, dimensions, integration and materials of the die structure apparatus may all be resorted to without departing from the spirit of the invention and the scope of the appended claims.

I claim:

1. In a shatterable unitary die and a shatterable plunger therefor, the combination comprising a die body having a groove on the bottom wall to engage a tool edge and adjacent side wall portions thereof, said die body having a cavity on the top wall portion aligned for registration with a portion of said groove, said cavity being extended into said portion of said groove whereby the tool edge and adjacent side wall portions lie intermediate the extended portion of the cavity for receiving impregnating material for the tool edge and adjacent wall portions thereof, and a plunger for pressure molding, sintering and fusing said material against said tool edge and wall portions thereof, said groove and cavity being arranged to afford planes of weakness to enable the die and plunger parts to be shattered away from the walls of the tool and the molded impregnating material thereon following die and plunger operation.

2. In a shatterable unitary die and shatterable plunger therefor, the combination comprising a die body having a continuous groove on the bottom wall to engage a tubular tool edge and adjacent side wall portions thereof, said die body having a plurality of spaced cavities extending from the top wall each aligned for registration with a portion of said groove, each of said cavities being extended into a portion of said groove whereby a corresponding part of the tool edge and adjacent side wall portions lie intermediate the extended portion of each of the cavities for receiving impregnating material for the tool edge and adjacent wall portions thereof, and plungers for each of the cavities for pressure molding, sintering and fusing said materials against said tool edge and wall portions thereof, said groove and cavities being arranged to afford planes of weakness to enable the die and plunger parts to be shattered away from the walls of the tool and the molded impregnating material thereon following die and plunger operation.

References Cited by the Examiner
UNITED STATES PATENTS

| | | |
|---|---|---|
| 1,087,974 | 2/1914 | Owen. |
| 1,856,851 | 5/1922 | Neuhauss. |
| 2,379,971 | 7/1945 | Krehbiel _____ 18—36 |
| 2,465,656 | 4/1946 | Schmidt. |
| 2,465,656 | 3/1949 | Morin _____ 18—36 XR |
| 2,482,239 | 9/1949 | Botwinick _____ 18—36 |
| 2,495,592 | 1/1952 | Morin _____ 18—36 |

WILLIAM J. STEPHENSON, *Primary Examiner.*